United States Patent
Netzel et al.

(10) Patent No.: US 6,921,125 B2
(45) Date of Patent: Jul. 26, 2005

(54) FOLDABLE VEHICLE ROOF FOR A CONVERTIBLE VEHICLE

(75) Inventors: Peter Netzel, Hamburg (DE); Thorsten Schumacher, Kummerfeld (DE); Thomas Halbweiss, Remseck (DE)

(73) Assignee: CTS Fahrzeug-Dachsysteme GmbH, Hamburg (DE)

( * ) Notice: Subject to any disclaimer, the term of this patent is extended or adjusted under 35 U.S.C. 154(b) by 0 days.

(21) Appl. No.: 10/732,207

(22) Filed: Dec. 10, 2003

(65) Prior Publication Data

US 2004/0155482 A1 Aug. 12, 2004

(30) Foreign Application Priority Data

Dec. 11, 2002 (DE) .......................................... 102 58 052

(51) Int. Cl.⁷ ................................................. B60J 7/19
(52) U.S. Cl. ................... 296/108; 296/107.17; 296/121
(58) Field of Search ................................ 296/108, 121, 296/107.01, 107.16, 107.17

(56) References Cited

U.S. PATENT DOCUMENTS

| | | | | |
|---|---|---|---|---|
| 5,026,110 A | * | 6/1991 | Koop et al. .................. | 296/108 |
| 5,769,483 A | * | 6/1998 | Danzl et al. ............ | 296/107.08 |
| 5,806,912 A | * | 9/1998 | Ramaciotti et al. .... | 296/107.09 |
| 5,944,375 A | * | 8/1999 | Schenk et al. ............... | 296/108 |
| 6,347,828 B1 | * | 2/2002 | Rapin et al. ........... | 296/107.17 |
| 6,702,362 B2 | * | 3/2004 | Eichholz et al. ............. | 296/108 |
| 6,767,045 B2 | * | 7/2004 | Reinsch ................. | 296/107.17 |
| 6,799,789 B2 | * | 10/2004 | Guillez et al. .............. | 296/121 |

FOREIGN PATENT DOCUMENTS

DE          199 57 012        6/2001

* cited by examiner

*Primary Examiner*—D. Glenn Dayoan
*Assistant Examiner*—Greg Blankenship
(74) *Attorney, Agent, or Firm*—Klaus J. Bach

(57) ABSTRACT

In a foldable vehicle roof for a convertible vehicle with an operating mechanism including spaced control arms pivotally supported on the vehicle body for moving the vehicle roof between a closed position, in which an interior vehicle space is covered, and an open position, and the vehicle roof includes a rear roof part and a roof part disposed in front of, and adjacent, the rear roof part, the rear roof part is biased in the closed position of the vehicle roof against the vehicle body by way of clamping means engaging one of the control arms with the rear roof part.

12 Claims, 8 Drawing Sheets

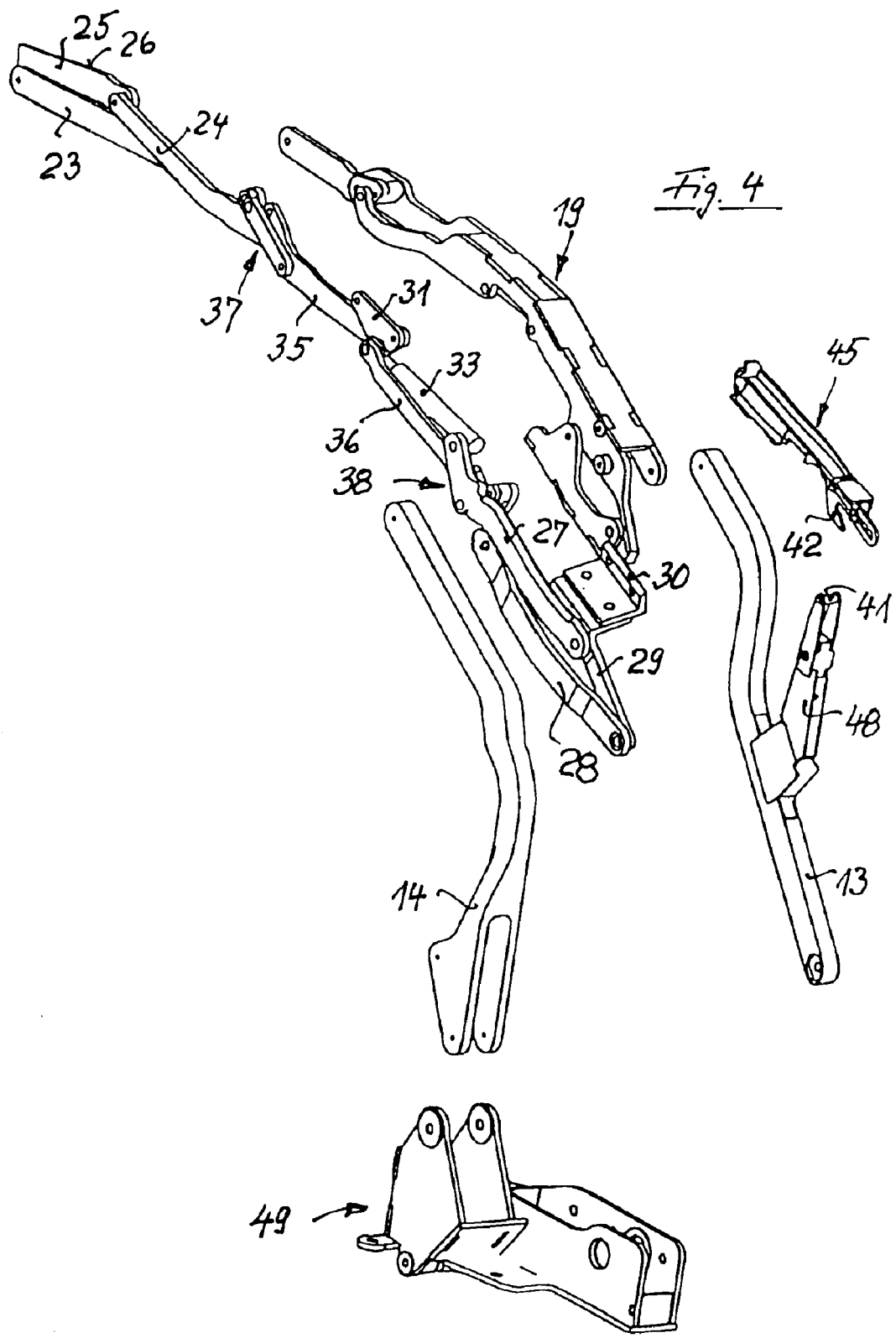

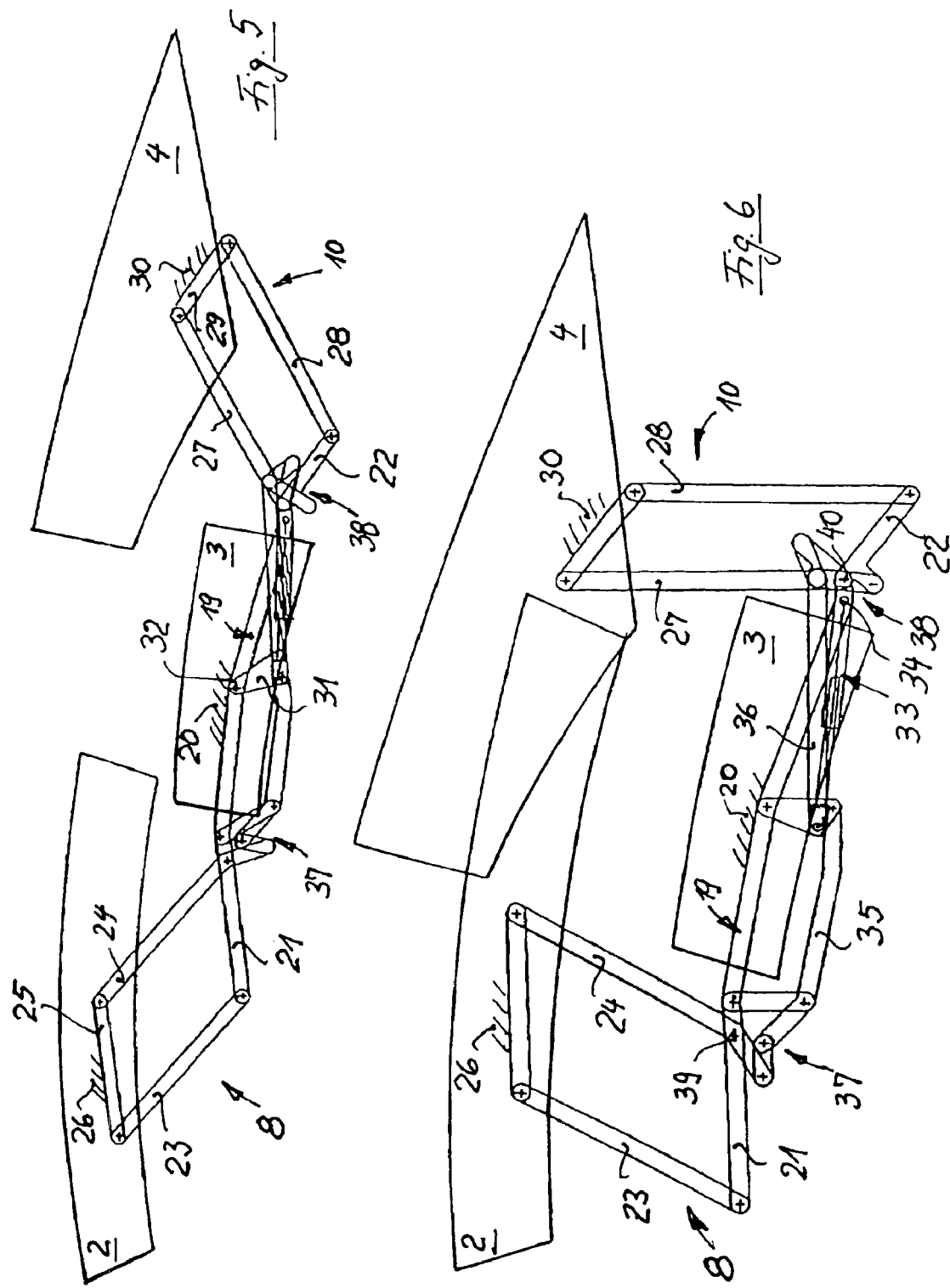

FOLDABLE VEHICLE ROOF FOR A CONVERTIBLE VEHICLE

BACKGROUND OF THE INVENTION

The invention relates to foldable vehicle roof for convertible vehicles, which roof is supported by a linkage mounted to the vehicle body so as to be movable thereby between a closed position and a storage position.

A foldable vehicle roof of this type is known for example from DE 199 57 012 A1. It includes a linkage, which is pivotally supported on a vehicle body and supports a roof cover material. At its rear end, the roof linkage includes a material support yoke, which extends transverse to the longitudinal vehicle direction and to which the roof cover material is connected for tensioning and holding the rear end part of the roof cover material down in engagement with the vehicle body when the roof is closed. Tensioning is achieved by a tensioning rod which extends, with the roof closed, forwardly and upwardly in the longitudinal vehicle direction and which is pivotally connected at its front end to a roof frame member which is supported by the roof linkage. By way of a cable connection extending alongside the tensioning rod, the roof cover material tensioning yoke is so connected to the roof linkage that, with the roof closed, the tensioning rod is biased into an upwardly over-stretched positioned so that it presses the roof material support yoke downwardly against the vehicle body support area. With Such an arrangement for folding roofs where the roof cover is supported on the vehicle body by way of the roof linkage, parts extending backwardly with the roof material well-tensioned can be biased into sealing relationship with the vehicle body, but it requires substantial design and construction expenses.

It is the object of the present invention to provide a foldable vehicle roof of the type as disclosed in the introductory part of the application wherein a firm engagement of the rear roof end with the vehicle body can be achieved with relatively simple means.

SUMMARY OF THE INVENTION

In a foldable vehicle roof for a convertible vehicle with an operating mechanism including spaced control arms pivotally supported on the vehicle body for moving the vehicle roof between a closed position, in which an interior vehicle space is covered, and an open position and wherein the vehicle roof includes a rear roof part and a roof part disposed in front of, and adjacent, the rear roof part, the rear roof part is biased in the closed position of the vehicle roof against the vehicle body by way of clamping means engaging one of the control arms with the rear roof part.

This arrangement requires relatively short operating travel lengths so that tensioning and engagement of the roof with the vehicle body can be achieved by relative movement between the operating arm linkage and the rear roof part.

It is also within the scope of the invention to provide at least one engagement element, which is adjustable with respect to the support element that is with respect to the guide linkage or the rear roof part, such that the respective adjustment movement can occur by way of an active or a passive control drive that is by a drive motor or an energy storage device. Particularly with regard to an energy storage device for the operating mechanism drive, a further simplification can be achieved in that the energy storage device is pre-tensioned during the opening movement of the roof.

For the engagement element which is movable relative to the respective support element, that is, for example, relative to the rear roof part, the guide arm system or the roof part which is directly connected to the guide arm system, a guide slot structure is a particularly expedient and simple structure for achieving the transfer of large support forces with little expenditures.

The foldable vehicle roof according to the invention may be in the form of a soft top or a hard top. However, the invention is particularly expedient in connection with multi-part hard tops which comprise at least one rear roof part and another roof part which is disposed in front of the rear roof part and wherein the rear roof part is disposed directly adjacent the other roof part which is supported by a guide linkage. With a three-part vehicle roof in the form of a hardtop, the other roof part is an intermediate roof part, which supports the rear roof part.

The invention is particularly expedient in connection with designs, wherein the intermediate roof part is supported by a parallelogram-like guide linkage. Such a guide linkage comprises two guide arms, which are pivotally supported on the vehicle body in spaced relationship in the longitudinal vehicle direction. One of the guide arms is provided with an engagement element, that is, preferably that guide arm which, in the longitudinal vehicle direction, is supported adjacent the rear roof part.

With respect to biasing the rear roof part in the closed position of the roof into engagement with its vehicle body support area in a way which is independent of the movements of the guide linkage, it is expedient to provide between the rear roof part and the guide linkage an independent engagement structure. Such an independent engagement structure is one that is independent of the guide linkage. It includes engagement elements of which one is disposed at the guide linkage and the other is supported by the rear roof part. Expediently one of the engagement elements is adjustable with respect to the support element and can be engaged with the other engagement element upon closing of the roof for tensioning and biasing the roof.

Such a solution is particularly advantageous for hardtop roofs which include a center roof part, which is disposed in front of the rear roof part and which supports the rear roof part. With such an arrangement, the rear roof part assumes first a position, in which it is not yet fully tensioned that is it is not yet firmly engaged with the adjacent intermediate roof part. Upon being biased into a fully closed position also the roof skin is stretched and the roof is biased into engagement with the vehicle body. This arrangement offers additional design capabilities and provides for a sealed connection between the rear and the intermediate roof parts, a reduction in stresses in the support connection between the intermediate and rear roof parts and, in connection with the abutment of the rear roof part on the vehicle body, a triangular tensioning force accommodation, whereby additional support is also provided by way of engagement of the front roof part with wind-shield frame so that the whole roof is maintained in a roof stiffening tension state.

Further particulars and features of the invention will become more readily apparent from the following description of a particular embodiment on the basis of the accompanying drawings.

BRIEF DESCRIPTION OF THE DRAWINGS

FIG. 4 shows the operating linkage of FIG. 3 in an exploded view, FIGS. 5 and 6 are schematic representations of the vehicle roof operating mechanism reduced to the elements of the operating system needed for the interconnection of the roof parts.

DESCRIPTION OF A PARTICULAR EMBODIMENT

Figure 1:
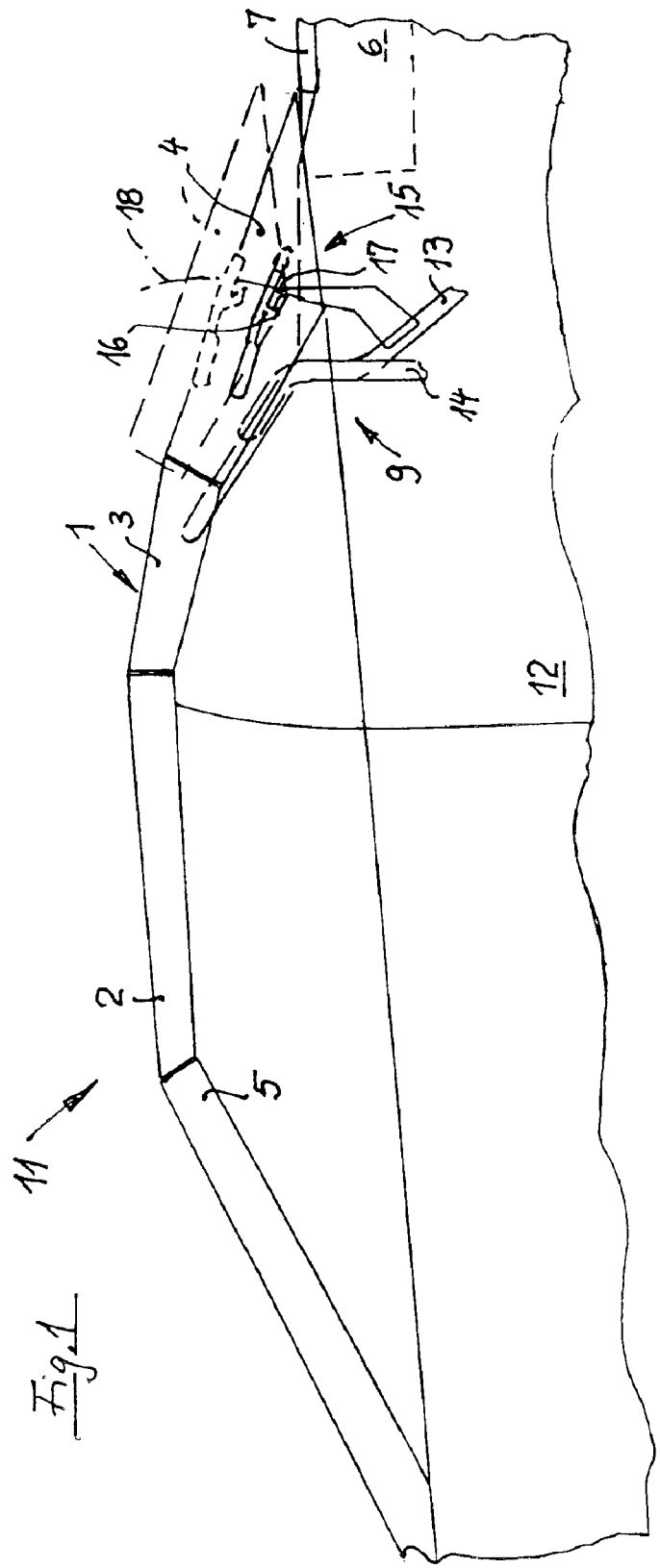
FIG. 1 is a side view of a passenger car showing a movable multi-part hardtop roof in a simplified representation.

FIG. 1 shows schematically a convertible vehicle 11 with a multi-part hardtop roof. In the embodiment shown, the roof is a three-part roof including a front part 2, a center part 3 and a rear part 4. When the roof is closed, it extends over the whole interior space of the vehicle from the windshield frame 5 back to a rear lid 7. In the area where the roof 1 joins the rear lid 7, a storage space 6 is indicated by dashed lines, in which the roof can be accommodated in a folded state.

Figure 2:
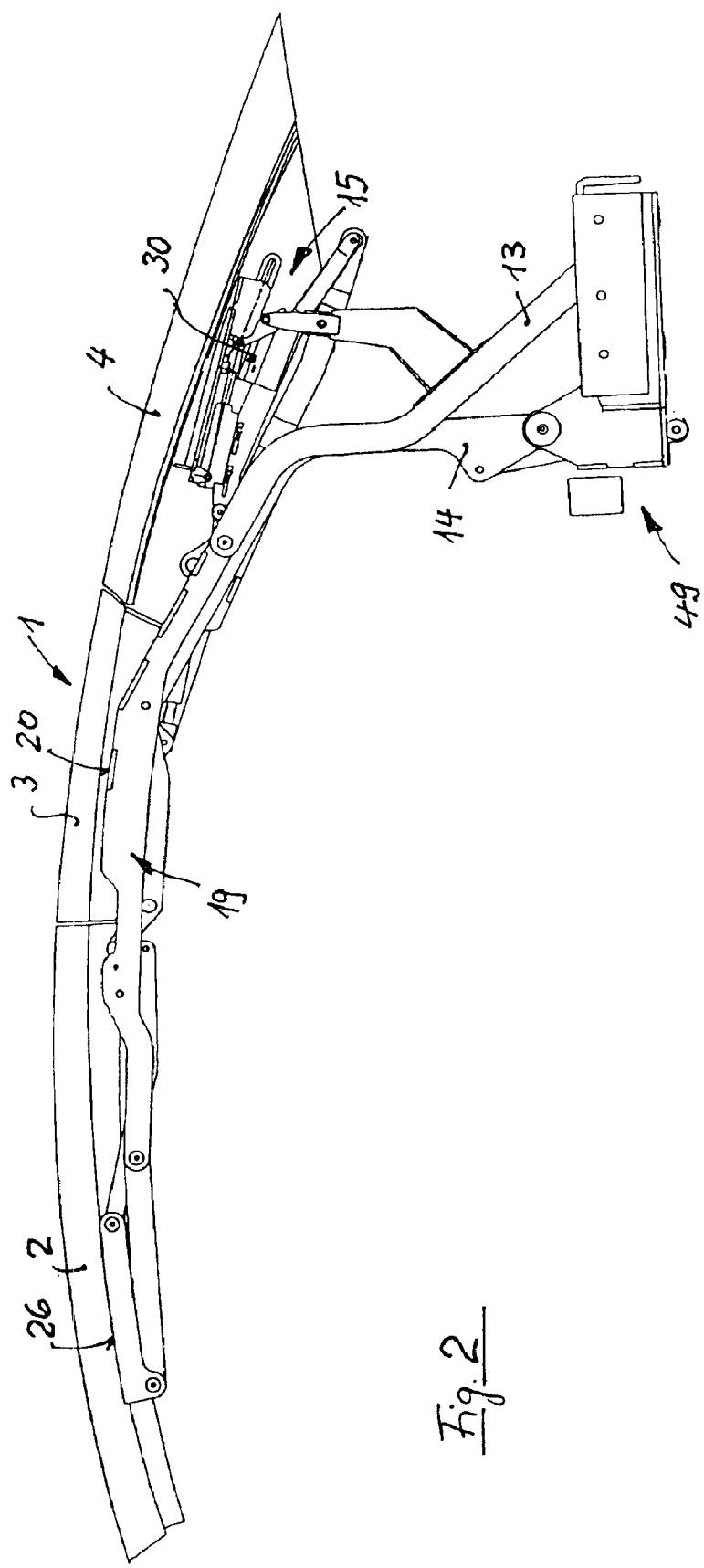
FIG. 2 shows a vehicle roof as presented in FIG. 1 in a cross-sectional view taken along line II—II of FIG. 1 including the operating linkage system for moving the vehicle roof between a closed and a storage position.

Of the operating linkage for the vehicle roof 1, FIG. 1 shows only the operating mechanism 9 for the center roof part 3, whose guide linkage comprises the control arm 13 as C-pillar arm and the control arm 14 as main guide arm, both being pivotally supported on a vehicle body support console 49 (FIG. 2). By means of the operating mechanism for the center roof part 3, the roof 1 is mounted to the vehicle body 1 since the front roof part 2 and the rear roof part 4 are mounted on the center roof part 3 as best shown in the schematic representations of FIGS. 5 and 6.

FIG. 1 further shows in a schematic manner that independently of the support of the rear roof part 4 on the center roof part 3, a tensioning structure 15 is provided between the operating mechanism 9, that is, in this case the C-pillar control arm 13 and the rear roof part 4. The tensioning structure comprises an engagement structure, that is hooklike engagement elements 16 and 17, associated with the roof and, respectively, the control arm 13 as will be explained in greater detail below. By way of the tensioning structure 15, the rear roof part is biased downwardly into firm contact with the vehicle body 12 when the vehicle roof 1 is closed. The engagement elements 16 and 17 are so arranged with respect to each other that in the initial position preceding the biasing, the roof-side engagement element 16 is in a move-in position with respect to the control arm side engagement element 17. The path of movement of the roof-side engagement element 16 of the rear roof part 4 preceding the engagement position is indicated in FIG. 1 by a dash-dotted line 18.

Figure 3:
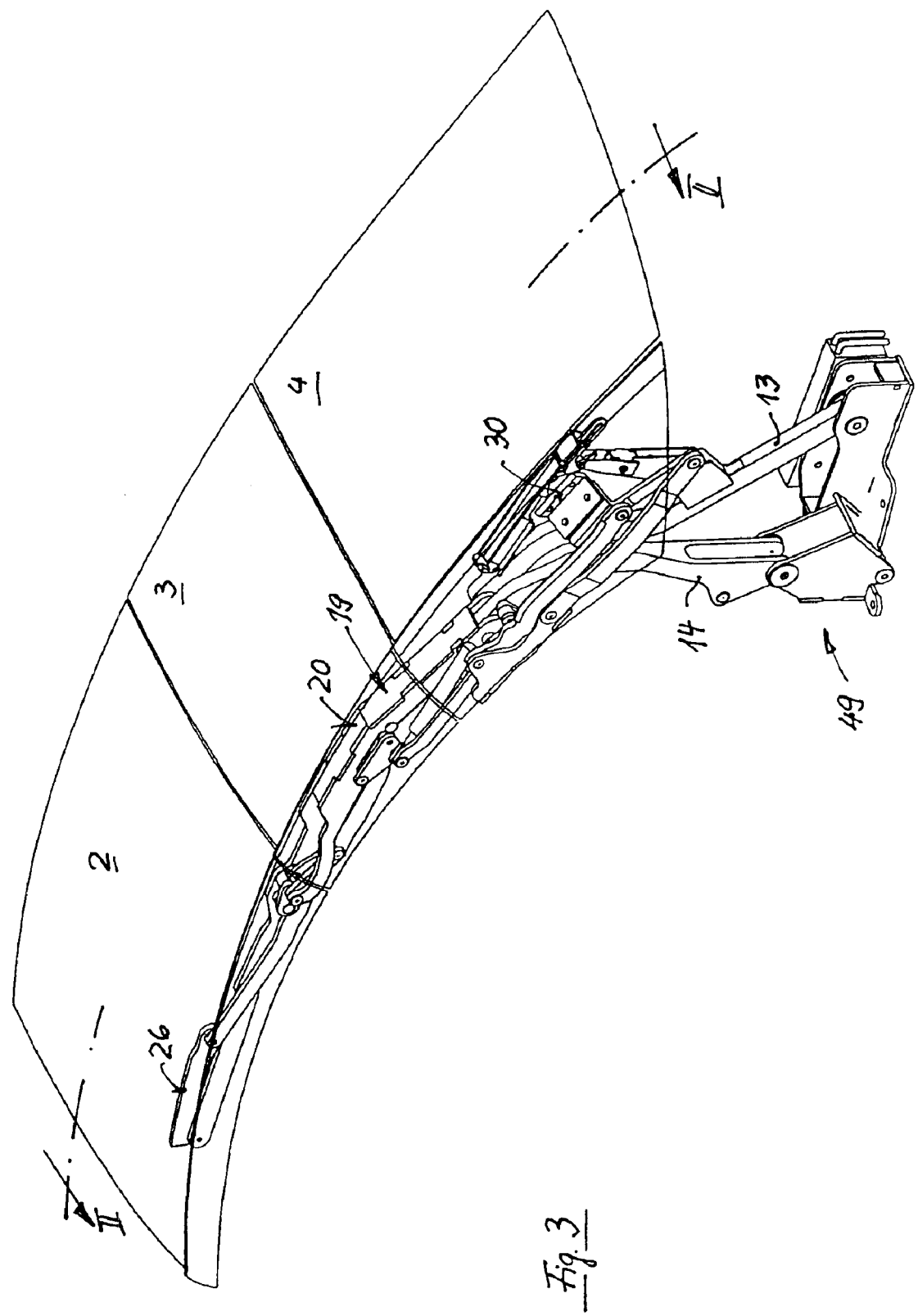
FIG. 3 is a perspective side view of the vehicle according to FIG. 2 with sections of the roof cut away.
Figure 7:
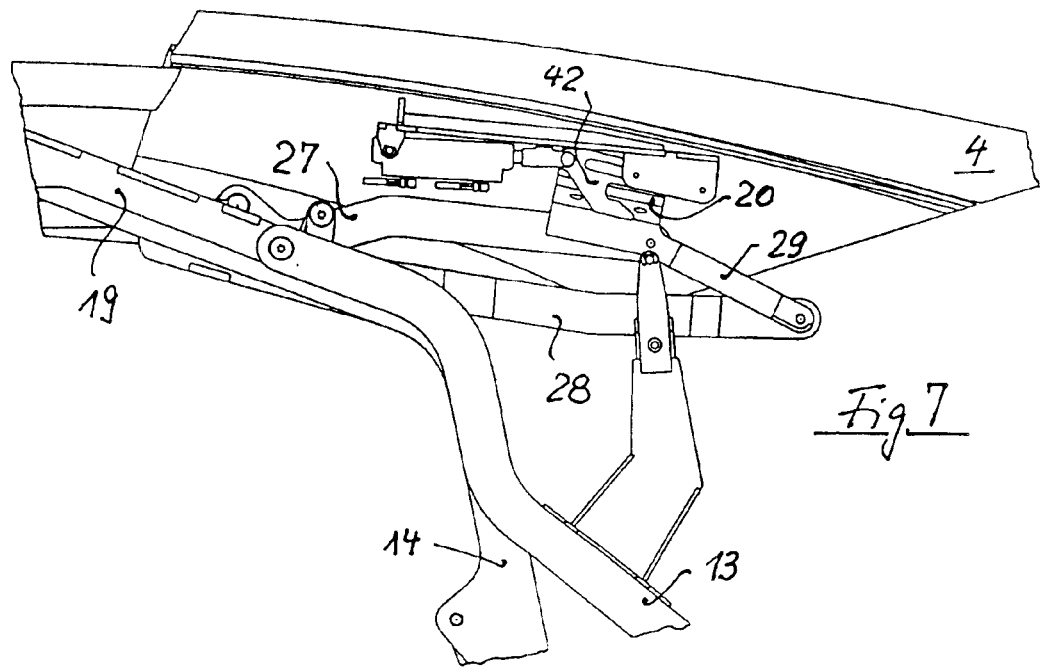
FIGS. 7 and 8 show the operating mechanism for the rear roof part in different opening states of the roof.
Figure 8:
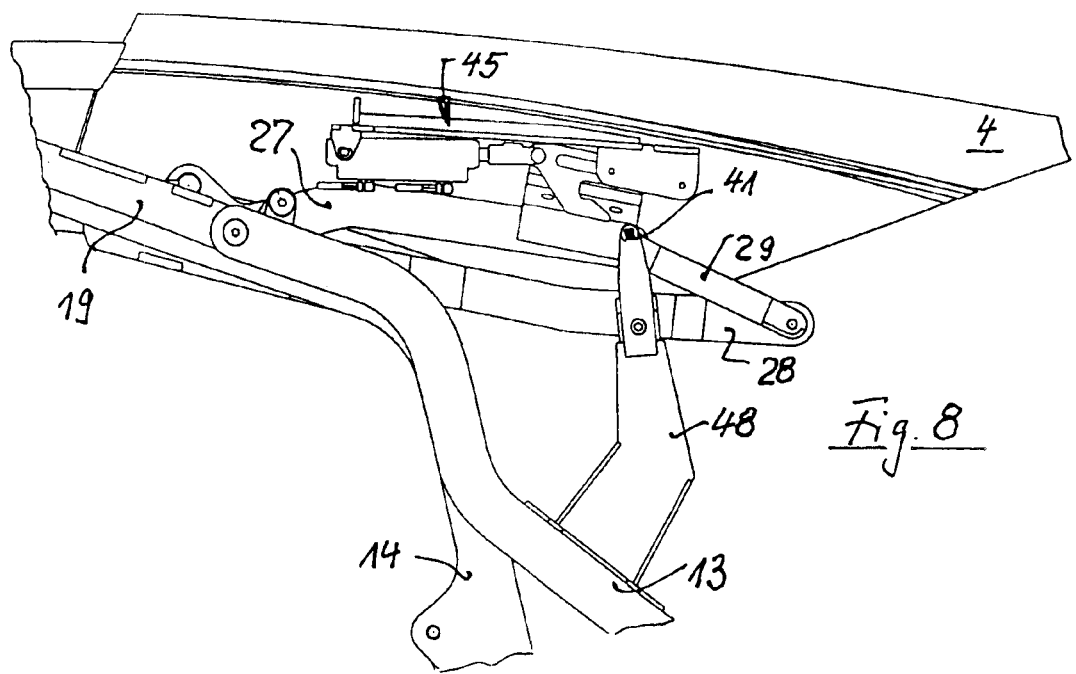

The whole operating mechanism for the vehicle roof 1 is shown in FIGS. 2 to 4. FIGS. 5 and 6 show simplified schematic representations of the vehicle roof 1 in different opening positions in order to more clearly show the mutual arrangement and functional coordination of the operating arms and links of the roof parts 2–4. For the individual arms and links of the operating mechanism as shown in FIGS. 2 to 6, the same reference numerals are used in order to facilitate an orientation.

In a way analogous to the four-link operating mechanism 9 by way of which the intermediate roof part 3 is connected to the vehicle body 12 and which is not shown in FIGS. 5 and 6, also the front roof part 2 and the rear roof part 4 are supported by four-link operating mechanisms 8 and, respectively, 10. The basis, that is, the support structure to which the four-link operating mechanisms 8 and 10 are attached, is the intermediate roof part 3, which is schematically indicated in FIGS. 5 and 6 by a beam 19. The beam 19 forms a support structure 20 for the intermediate roof part 3 and also forms the bases 21 and, respectively, 22 of the operating mechanism 8 and 20 for the front and rear roof parts 2 and 4. The four-link operating mechanism 8 for the front roof part 2 further includes control arms 23 and 24 and a coupling link 25, which forms the support structure 26 for the front roof part 2. The base 22 supports a four-link operating mechanism 10 for the rear roof part 4 including the control arms 27 and 28 and a coupling link 29, which forms the support structure 30 for the rear roof part 4.

FIGS. 5 and 6 show that, the roof parts 2, 3, 4 which, in the closed position of the roof, are longitudinally aligned, are stacked on top of one another in a storage position. With the transition from FIG. 5 to FIG. 6, it is indicated that in the storage position the front roof part 2 is disposed between the center roof part 3 and the rear roof part 4, which is disposed on top, although the final storage position in which the roof parts are stacked closely on top of one another is not shown.

With a common drive arrangement, a pivot lever 31 is supported on the center roof part 3 or respectively, the support beam 19 by a pivot bearing structure 32. The pivot lever 31 is operable by a drive 33, which in the embodiment shown is in the form of an operating cylinder but which also may be a spindle drive. The operating cylinder forming the drive 33 extends in the longitudinal direction of the roof 1 and is supported by the support beam 19 at the support point 34. In about the same direction extend also the operating arms 35 and 36, which are connected to the pivot lever 31 and which are connected, each by way of a coupling mechanisms 37, and respectively, 38 to the operating arms 24 and, respectively, 27 of the operating mechanisms 8 and, respectively, 10 adjacent the intermediate roof part 3. The connections with regard to the opposite pivot movements of the roof parts 2 and 4 with respect to the pivot axes 39 and 40 of the operating arms 24 and, respectively, 27 are disposed at opposite ends of the support beam 19. In FIGS. 2 to 4, the reference numerals as introduced in the schematic representations 5 to 6 are used. These figures show the space-saving arrangement of the roof components in accordance with the invention.

Furthermore, FIGS. 2 to 4 show, supplementary to FIG. 1, the tensioning structure 15 between the operating mechanism 19 for the intermediate roof part 3 and the rear roof part 4. The C-pillar support arm 13 is provided with a support member 48 which includes an engagement member in the form of a bolt 41 corresponding to an engagement element 16. The engagement element 16 extends from the rear roof part 4 at the connection of the rear roof part 4 with the intermediate roof part 3.

The engagement element 16 comprises a catcher hook 42, which is mounted to the roof part 4 so as to be movable in the longitudinal vehicle direction guided by a guide groove 43. This slide guide together with the catcher hook 42 and a control drive 44 connected to the catcher hook 42 are combined to a construction unit 45, which is mounted to the roof part 4 possibly in such a way that the unit 45 is pivotable about an axis extending in the longitudinal direction of the vehicle. The control drive 44 is in the embodiment shown an operating cylinder whose hydraulic supply line connections are indicated by the reference numeral 46.

Figure 9:
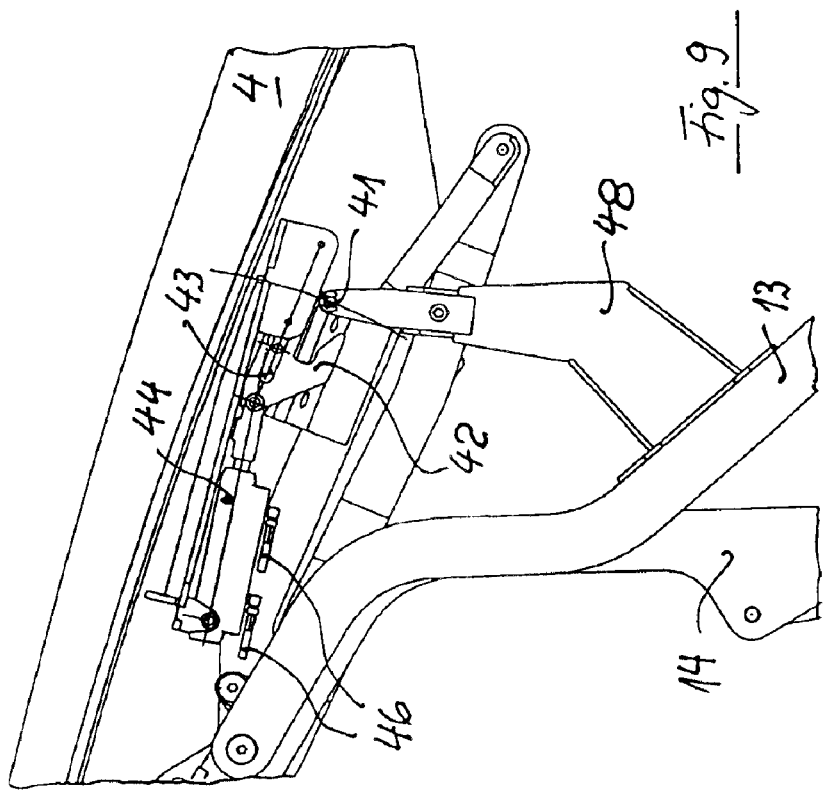
FIGS. 9 and 10 show the mechanism shown already in FIGS. 7 and 8, however the rear roof part being shown in a closed position with the engagement or interlocking structure for the rear roof part being shown closed in FIG. 9 and open in FIG. 10, and FIGS. 11 and 12 show the interlocking means open in FIG. 11 and closed in FIG. 12.
Figure 10:
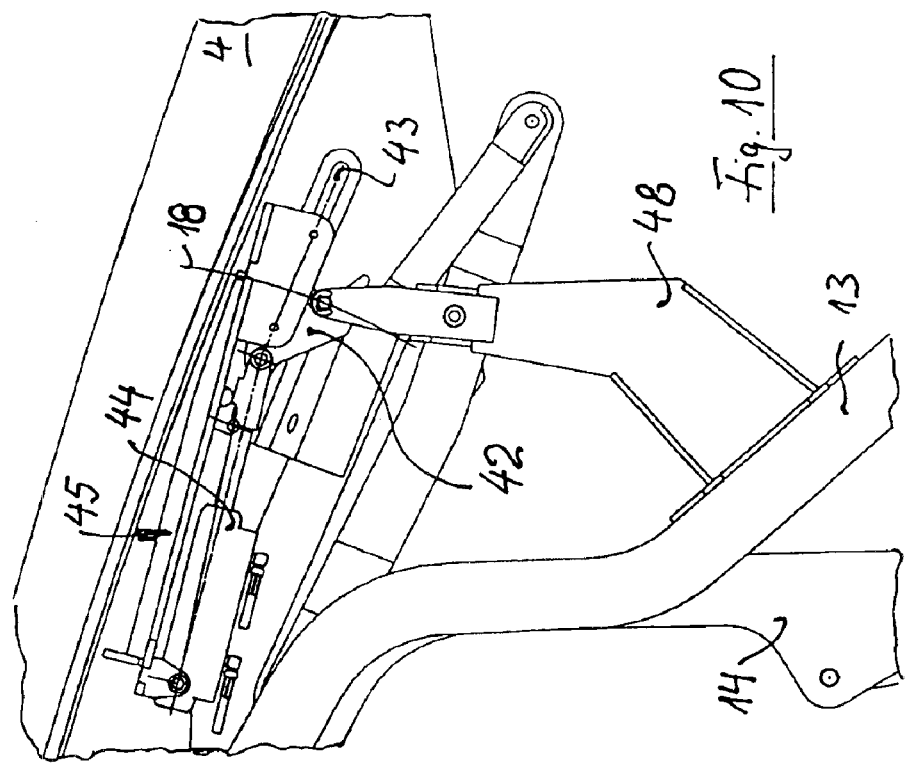
Figure 11:
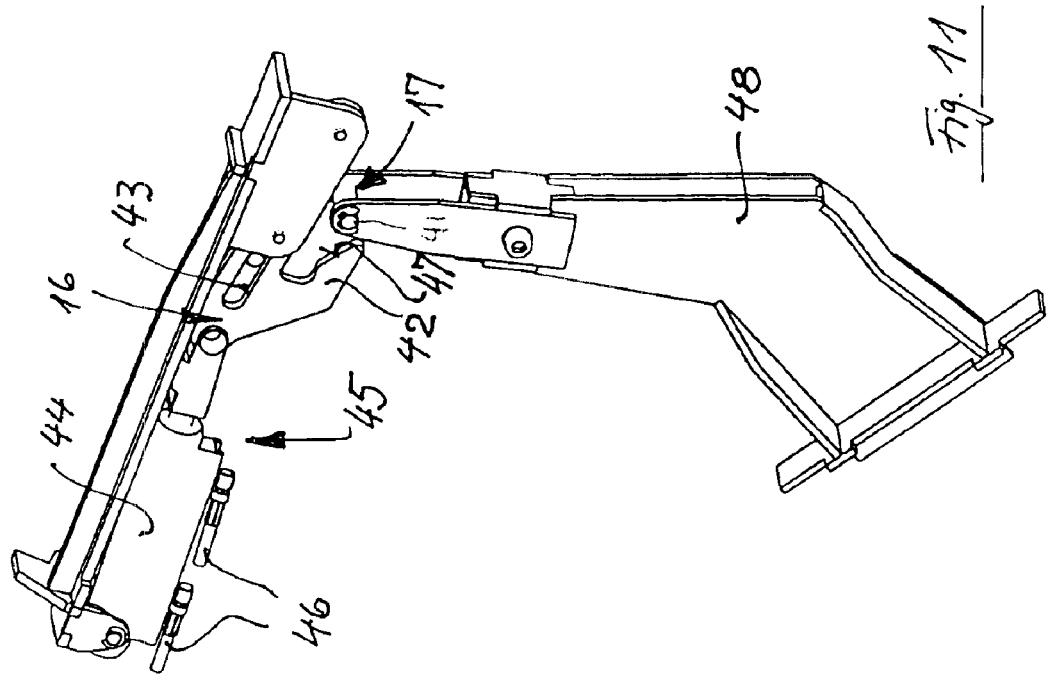
Figure 12:
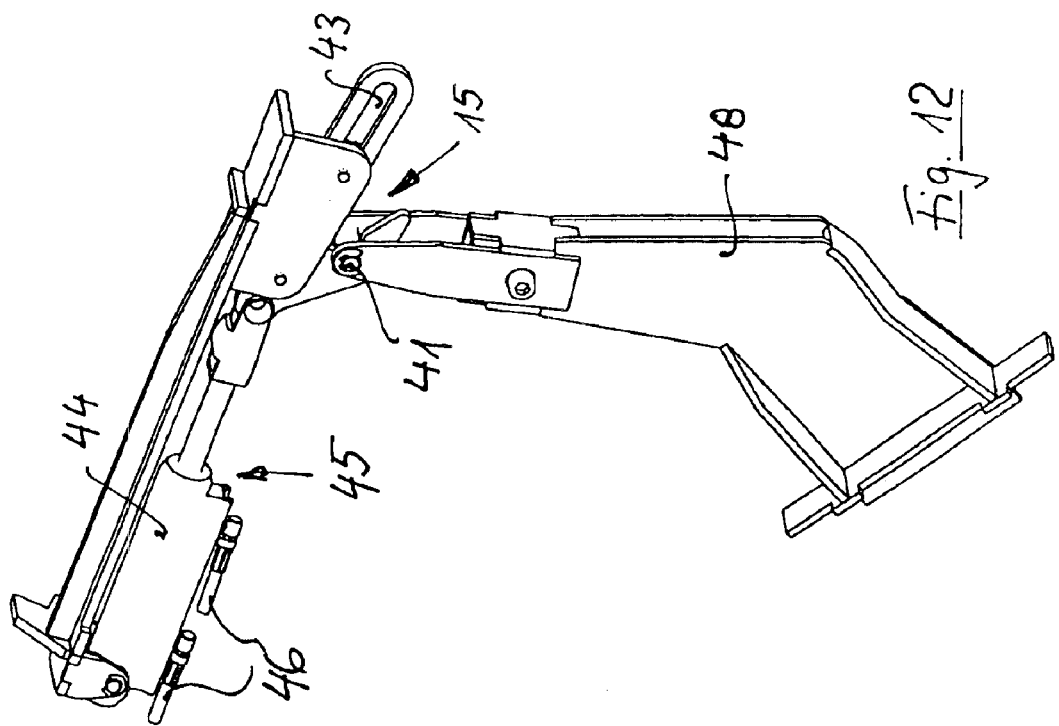

FIGS. 9 and 11 or, respectively, 10 and 12 show biasing connections in an open and a closed position, wherein FIGS. 9 and 10 show the engagement path 18 of the roof part 4—with respect to a point corresponding to the engagement element 17—of the roof part 4. It is apparent from the drawings that, in the shown embodiment, the lid-side engagement element 16 must first be brought into engagement with the engagement element 17 associated with the operating arm 13, when the rear roof part 4 has reached its rear closed end position so that the rear roof part 4 is biased into contact with the vehicle body with a slight height displacement. In order to achieve such a biasing condition, the engagement element 16 includes a hook 42 with an inclined engagement surface 47.

The embodiment presented in the drawings does not show the possible arrangement of a guide structure, wherein, with the pivoting of the operating mechanism 9 for the center roof part 3, the engagement element associated therewith is not only brought into a position ready for engagement with the respective counter element (engagement hook 16) but already into an engagement position, so that a biasing force is generated in this way. The drive unit 45 could then be omitted. It would also be possible to make at least one of the engagement elements adjustable particularly in connection with a corresponding pivot drive.

What is claimed is:

1. A foldable vehicle roof for a convertible vehicle body (12) comprising a support and operating mechanism (9) including guide and support linkages (13, 14) pivotably supported on said vehicle body (12) so as to be movable between a closed position, in which the vehicle roof (1) covers an interior vehicle space and an open position, in which the vehicle roof (1) is moved to a storage position, said vehicle roof (1) including a rear roof part (4), an adjacent intermediate roof part (3) disposed in front of said rear roof part (4) and a front roof part (2), said intermediate roof part (3) being supported by said guide and support linkage (13, 14) and said rear roof part (4) being supported by said intermediate roof part (3), said rear roof part (4) being further biased in the closed position of said vehicle roof (2) against a support area of said vehicle body (12) by clamping means engaging the guide and support linkage (13, 14) and said intermediate roof part (3), said clamping means including two hook elements (16, 17) of which one is part of said rear roof part (4) and the other is part of the guide and support linkage (13, 14) for the intermediate roof part (3).

2. A foldable vehicle roof according to claim 1, wherein said two hook elements (16, 17) are arranged so as to move into mutual engagement when said vehicle roof is moved to a closed position.

3. A foldable vehicle roof according to claim 1, wherein said two hook elements (16, 17) are arranged so as to be moved into a clamping force generating engagement position by the closing of the vehicle roof.

4. A foldable vehicle roof according to claim 1, wherein at least one of said hook elements is movable relative to the other.

5. A foldable vehicle roof according to claim 4, wherein the hook element (17) disposed on said control arm (13) is movable.

6. A foldable vehicle roof according to claim 4, wherein hook element (16) supported on the rear roof part (4) is movable.

7. A foldable vehicle roof according to claim 4, wherein the movable hook element (16, or respectively, 17) is movable by a drive means.

8. A foldable vehicle roof according to claim 4, wherein the movable hook element is provided with a slot guide structure (43) extending in the direction of movability of said movable hook element.

9. A foldable vehicle roof according to claim 1, wherein said guide and support linkage is a parallelogram-like support and operating mechanism and said support and operating mechanism includes a C-pillar arm (13) and a guide arm (14), which are pivotally supported on the vehicle body (12) in spaced relationship and one of said C-pillar arm (13) and said guide arm (14) is provided with engagement means (17) for engaging said rear roof element (4).

10. A foldable vehicle roof according to claim 9, wherein said engagement means is mounted on said C-pillar arm (13), which is disposed in the longitudinal vehicle direction rearwardly of the guide arm (14).

11. A foldable vehicle roof for a convertible vehicle body (12) comprising a support and operating mechanism (9) including guide and support linkages (13, 14) pivotably supported on said vehicle body (12) so as to be movable between a closed position in which the vehicle roof (1) covers an interior vehicle space and an open position, in which the vehicle roof (1) is in a storage position, said vehicle roof (1) including a rear roof part (4), an adjacent intermediate roof part (3) disposed in front of the rear roof part (4) and being movably supported by said guide and support linkages (13, 14), said rear roof part (4) being supported by said intermediate roof part (3) so as to be movable relative thereto, said rear roof part (4) being braced in the closed position of the vehicle roof (2) against a support area of the vehicle body (12) by clamping means engaging the guide and support linkage (13, 14) and the intermediate roof part (3) and including two hook elements (16, 17) of which one is part of the rear roof part (4) and the other is part of the guide and support linkage (13, 14) for the intermediate roof part 93).

12. A foldable vehicle roof according to claim 11, wherein the rear roof part (4) is movably supported relative to the intermediate roof part (3) by a four link mechanism (10) including control arms (27, 28) and a coupling structure (29) carrying a support structure (30) for the rear roof part (3).

* * * * *